United States Patent [19]

Schmidt

[11] E Re. 31,256

[45] Reissued May 31, 1983

[54] AUTOMATIC DAMPER MEANS AND CONTROLS THEREFOR

[76] Inventor: Robert H. Schmidt, 9620 Copley Dr., Indianapolis, Ind. 46290

[21] Appl. No.: 357,833

[22] Filed: Mar. 12, 1982

Related U.S. Patent Documents

Reissue of:

[64] Patent No.: 4,254,759
Issued: Mar. 10, 1981
Appl. No.: 870,479
Filed: Jan. 18, 1978

[51] Int. Cl.[3] ..... F23J 11/00; F23L 1/00; F23N 5/10

[52] U.S. Cl. ..... 126/307 A; 110/163; 126/285 B; 236/1 G; 431/20; 431/80

[58] Field of Search ..... 126/285 R, 285 B, 307 A; 236/1 A, 1 G; 431/20, 18, 78, 79, 80; 110/163

[56] References Cited

U.S. PATENT DOCUMENTS

| | | | |
|---|---|---|---|
| 2,117,787 | 5/1938 | Bock | 126/285 B |
| 2,184,983 | 12/1939 | Tornquist | 431/20 |
| 2,613,543 | 10/1952 | Will | 126/285 R |
| 2,856,484 | 10/1958 | Fairbanks | 126/285 B |
| 3,010,451 | 11/1961 | Hodgins | 126/285 B |
| 3,273,625 | 9/1966 | Holtzman et al. | 236/1 G |
| 3,542,018 | 11/1970 | Quick | 431/20 |
| 3,544,247 | 12/1970 | Blackett | 431/18 |
| 3,580,238 | 5/1971 | Diehl | 236/1 G |
| 3,773,028 | 11/1973 | Schreibeis | 126/285 B |
| 3,986,814 | 10/1976 | Demere | 431/79 |
| 4,009,705 | 3/1977 | Smith | 126/307 A |
| 4,017,024 | 4/1977 | Grostick et al. | 236/1 G |
| 4,079,884 | 3/1978 | Sherman | 236/1 G |
| 4,084,743 | 4/1978 | Matthews et al. | 236/1 G |
| 4,087,045 | 5/1978 | Matthews | 236/1 G |

*Primary Examiner*—Daniel J. O'Connor
*Attorney, Agent, or Firm*—Robert A. Spray

[57] ABSTRACT

An automatic damper means and controls, which provide an exceedingly safe automatic damper for the exhaust duct-work of an associated gas furnace or the like, by automatic control of the damper, and automatic control of the gas supply, with redundancy features for providing exceedingly safe operation.

16 Claims, 10 Drawing Figures

AUTOMATIC DAMPER MEANS AND CONTROLS THEREFOR

Matter enclosed in heavy brackets [ ] appears in the original patent but forms no part of this reissue specification; matter printed in italics indicates the additions made by reissue.

The present invention relates to an automatic damper means, such as for gas furnaces, and to control means therefor; and concepts provide exceeding high safety, with ample redundancy as to the control of the combustion gas, and with automatic control of the actuation and setting of the damper as to assure safety.

It has been long known that many installations such as gas furnaces and the like, utilizing the combustion of fuels, would be more effective if an amply-safe means could be provided for automatically controlling the flue or exhaust ducts thereof so as to cause the exhaust duct-work to be closed during idle periods of the equipment yet automatically open if the equipment was in its combustion mode or operation.

Obviously, the products of combustion of fuel are or can often be very dangerous and even fatal to human beings if not safely exhausted; and thus the lack of an effective and fool-proof automatic damper control has long meant that no automatic damper means has been permitted to be used.

Obviously, also, much heat has been wasted, by exhaust flues being always open, as is generally considered to be necessary for most persons would forget to open any closed damper prior to utilizing a furnace or heater; and thus no heat-saving dampers are provided for such equipment. Even as to fireplace installations which do have dampers, many homeowners leave them always open, once they have experienced an accident of leaving them closed during operation.

Accordingly, the present concepts of a reliable and amply safe automatic damper, with features of redundancy as to safety factors, provide a very advantageous installation achieving a tremendous savings in heat energy presently wasted, yet providing high safety nevertheless.

Further, the concepts provide that the damper unit may be relatively easily installed, as a unit, which contains the damper and the controls therefor, and, further, the concepts provide extra safety by heat-sensitive components easily mounted to components, such as the draft diverter, which are generally easy and convenient to reach, and [which provide a component] which provide a component which readily can indicate any heat build-up which would be an indication of any flue blockage or malfunction of the flue or the damper means.

The accompanying drawings illustrate the concepts:

FIG. 1 is an elevational view, partly in section, and with portions broken away for clarity, of the damper control mechanism mounted on a duct-section which would be installed as a unit into the exhaust duct of the associated furnace or the like;

FIG. 10 is a schematic representation of both the damper control means and the heat-sensitive control means which is mounted in the draft diverter of the associated furnace or the like.

Figure 2:
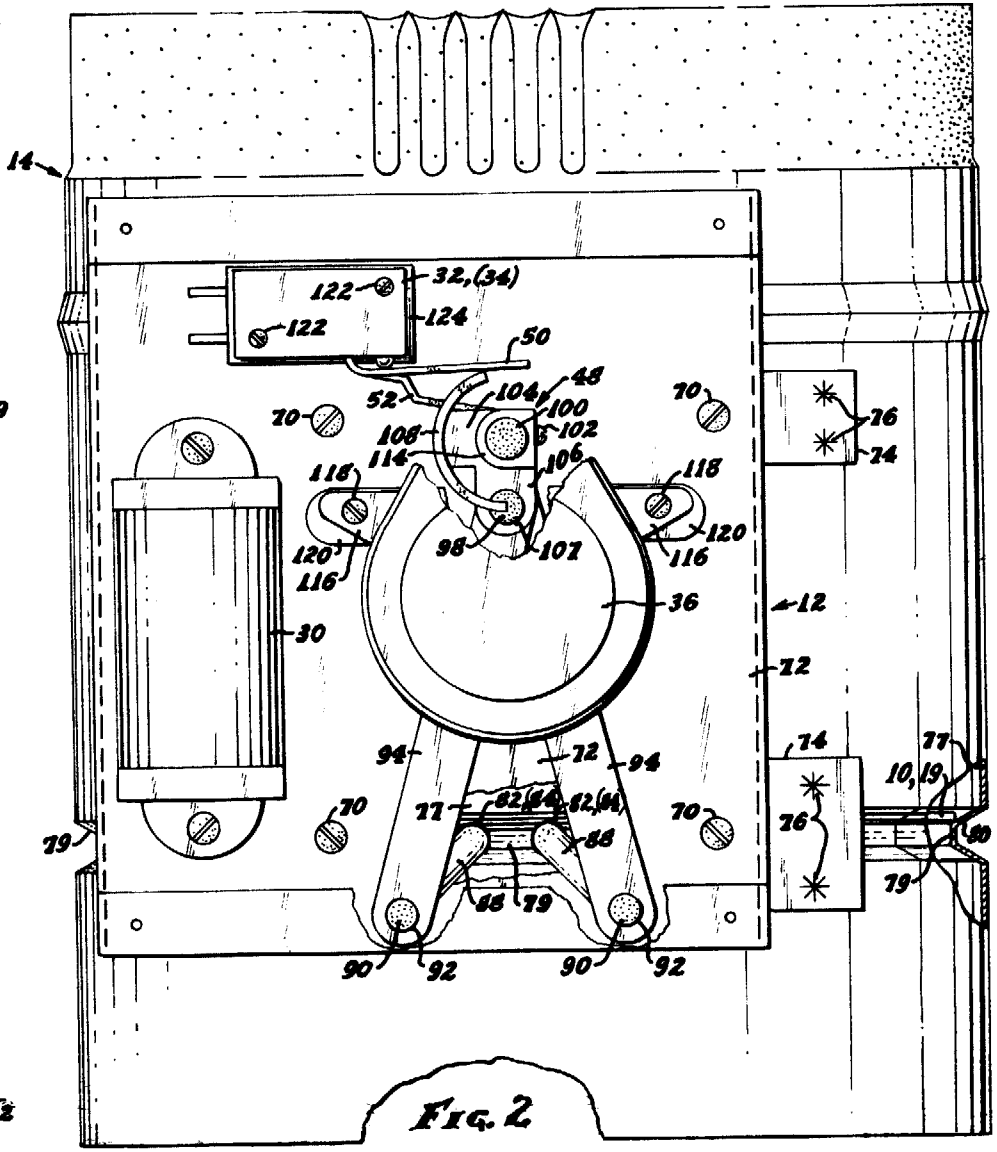
FIG. 2 is an elevational view of the parts shown in FIG. 1, taken generally as indicated by view-line 2—2 of FIG. 1, portions shown as removed or broken away for clarity, and to avoid obscuring of details otherwise hidden.

(It will be understood that the drawings are to a certain extent schematic, for illustrating the concepts.)

As stated above, the invention provides controlled damper means for a gas furnace or the like, which provides the advantage of fuel-saving economy of an automatically movable damper but nevertheless also provides safety in the form of a fully complete shutdown of the related appliance in the event of a burner malfunction, or flue restriction or damper failure.

The drawings illustrate details of the inventive concepts. As there shown, the most obvious general components or sub-assemblies are the damper 10 (FIGS. 2, 3, 4, and 8), damper-movement control 12 which is mounted on the side of a damper housing 14, and auxiliary safety control 16 mounted in the draft diverter 18 of the furnace's exhaust duct 20.

As illustrated in this embodiment, the damper 10 and the damper-movement controls 12 are provided in a pre-assembled manner on a damper housing 14 which is shown as a short duct section which the user will insert into the furnace's exhaust duct 20.

Each of these general components or sub-assemblies (10, 12, and 16) are now more fully described, in conjunction with their use in this advantageous invention.

The damper assembly 10 is shown as of two-part nature. That is, the damper 10 as shown is provided to have two semi-circular plates 19 which are movably supported (as detailed below) centrally of the damper housing 14 of exhaust duct 20, along a diameter thereof.

Figure 3:
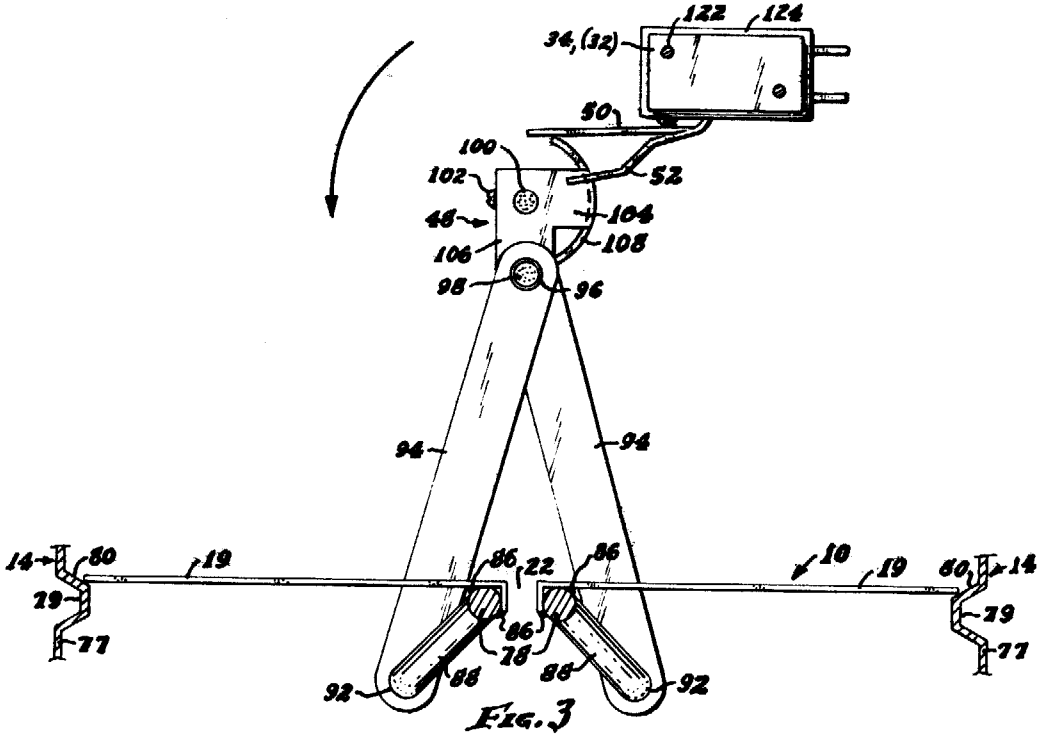
FIG. 3 is a diagrammatic view of the damper-control mechanism of FIGS. 1 and 2, but illustrating only certain portions thereof, this view illustrating the damper in duct-closed position, and taken generally as indicated by view-line X—X of FIG. 1.

It will be noted that the damper assembly 10 is formed such that between the damper-plates 19 there is a space 22 (FIGS. 3,4) extending diametrically of duct-section 14, at the juncture of the two damper-plates 19. That slot or opening 22 is large enough to allow proper operations of damper plates 19 and to permit any gas leakage to draft upwardly out of exhaust duct 20, even when the damper plates 19 are in closed position as shown in FIG. 3.

Figure 10:
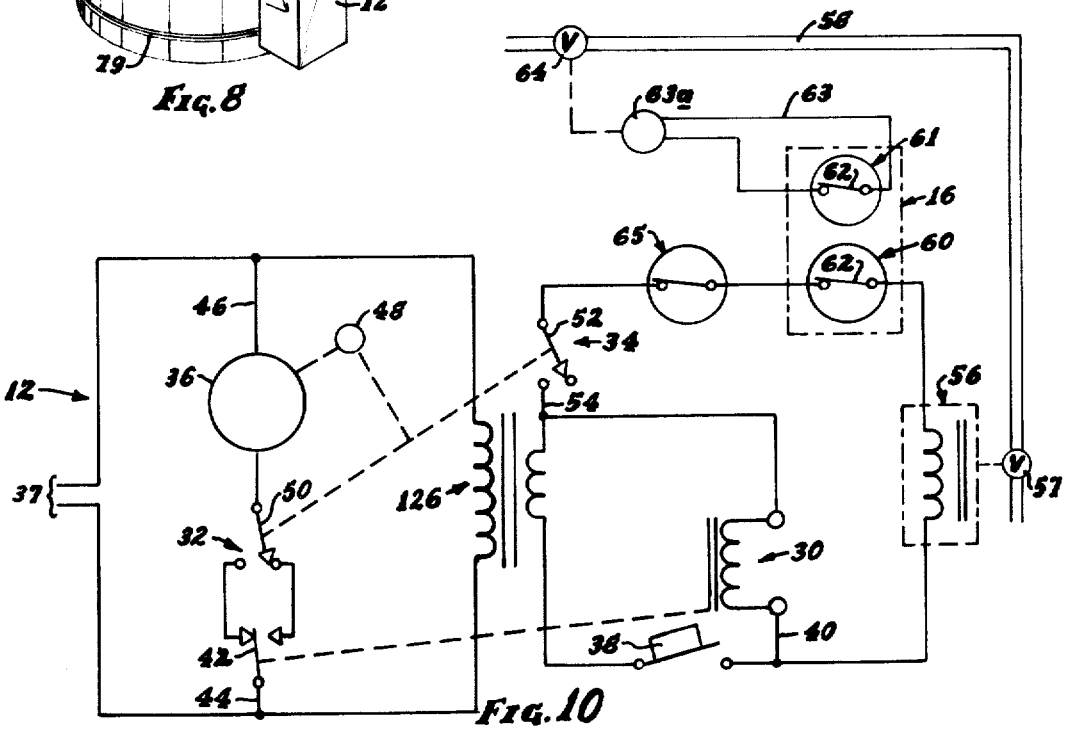

Control 12 for damper 10, for damper-opening:

The damper control 12 will now be described in conjunction with its illustrative showing in the drawings. As shown in FIGS. 1,2,3,4 and 10, its most obvious components are relay 30, a pair of microswitches 32 and 34, and a motor 36 having a gear reduction feature. FIG. 10 shows the circuitry, now described, power being supplied at 37.

Operation of the damper control unit 12, for damper-opening, is as follows: When the associated thermostat 38 of the furnace control calls for heat, it being assumed that the damper plates 19 have been at that time in closed position, the relay 30 is energized through energization of relay circuit 40. This energization of relay 30 in turn moves to switch to closed position one switch blade 42 of the relay's normally-open switch contacts in the portion 44 of the motor circuit 46. This energizes the drive motor 36; and the motor 36 begins to turn, that motor movement causing an actuator cam 48 (FIGS. 1, 2, 3, 4, 5, and 10) to revolve 180°.

At this point, the damper plates 19 have moved 90° to open position, due to that movement of the drive motor 36, as explained more particularly hereinafter.

This movement of the actuator cam 48 driven by motor 36 activates the two microswitches 32 and 34, as explained more particularly below, the microswitch 32 then turning off the drive motor 36 by its switch blade 50 moving to an open position in which it opens the motor-circuit 44 which through switch blade 42 had energized the switch contact from which the switch blade 50 left as caused by that 180° movement of cam 48.

That movement of cam 48 also, in its movement which corresponds to the last 4° of opening of the damper plates 19, causes the normally-open blade 52 of the microswitch 34 to move to switch-closed position, closing circuit 54 to thereby energize the gas valve solenoid 56 of gas valve 57 of gas line 58 for the furnace, firing the furnace; but, as mentioned above, the damper plates 19 of damper 10 have moved to the duct-open position.

Control 12 for damper 10, for damper-closing:

When the temperature-need has been satisfied, the thermostat 38 opens the relay circuit 40, moving switch blade 42 of relay 30 back off (leftwardly in FIG. 10) from the contact which had energized the motor 36 through motor circuit-portion 44 and the other switch blade 50 prior to that switch blade 50 having moved to its other position; but this change of switch blade 42 (to the left in FIG. 10) again now energizes the motor 36 due to the other switch blade 50 now being in circuit-closing (leftward, FIG. 10) position now in series with switch blade 42, again energizing the motor 36 through motor-circuit 44.

The motor 36 then begins its movement of another 180°; and this causes the microswitch 32 to again change due to actuation of cam 48, and this moves switch blade 50 to a position (rightward, FIG. 10) again out of series with switch blade 42 and thus again de-energizing the motor 36 by de-energizing or opening the motor-circuit portion 44.

(The motor 36 is now back at the beginning of its cycle described, awaiting energization through circuit portion 44 the next time the closing of the thermostat 38 in a heat-needing situation energizes relay circuit 40 to actuate the relay 30.)

Similarly to the actuation during damper-opening, and as explained further below, this movement of motor 36 and its actuator cam 48 also causes switch blade 52 of microswitch 34 to move to open-circuit position, de-energizing the gas valve solenoid 56 of gas valve 57, in the first 4° of damper-closing actuation of damper plates 19 as caused by this movement of drive motor 36.

Auxiliary Safety Controls 16:

The advantageous safety control 16 as shown comprises a pair of thermal discs 60 and 61. These thermal discs 60 and 61 are devices which have a switch 62 which is normally closed but which opens in response to heat.

The circuitry in which the thermal discs 60 and 61 are contained is shown as now described, as shown in FIG. 10.

One of the thermal discs 60 is in the circuit 54 and therein in series with the magnetic solenoid 56 of gas valve 57 which is actuated by closure of the thermostat 38 when heat is needed, although that thermal disc 60 is located in the auxiliary safety control box 16. Heat energization of the thermal disc 60 opens its switch 62, opening electric control circuit 54 and thus closing gas valve 57.

The other thermal disc 61 is in a circuit 63 in series with the thermocouple 63a which activates another gas valve 64, that valve 64 being in series with the gas valve 57 which is controlled by the controlled gas valve solenoid 56 mentioned above. The operativity of control circuit 63 is such that the gas valve 64 is open if there is no heat-energization of the thermal disc 61 in control circuit 63 by a heat build-up in the draft diverter 18, which opens switch 62 and thus circuit 63, closing gas valve 64.

It is to be noted that the two gas valves 57 and 64, being in series, achieve a double positiveness of safety control, for each is controlled by one of the heat-responsive current-stopping thermal discs 60 and 61. Thus the two thermal discs 60 and 61 provide double positiveness of safety; for the heat-actuated opening of the respective circuit through either one thermal discs 60 or 61 would itself act to close (or permit closure, depending upon the bias of gas valve controls used) one of the two gas valves 57 and 64 in the series arrangement noted.

Figure 6:
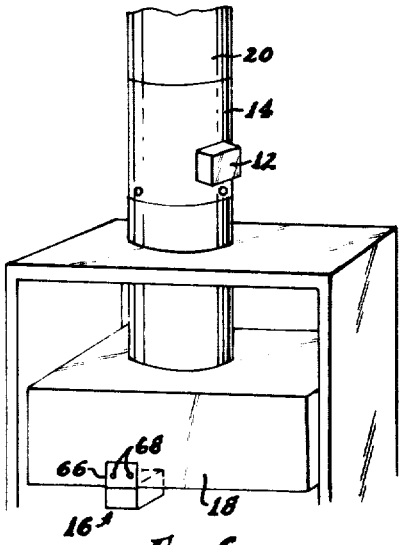
FIG. 6 is a pictorial representation of a furnace or the like, having the damper control mechanism and duct unit of FIGS. 1 and 2 installed in the unit's duct-work, and illustrating control means also installed in the unit's draft diverter.
Figure 7:
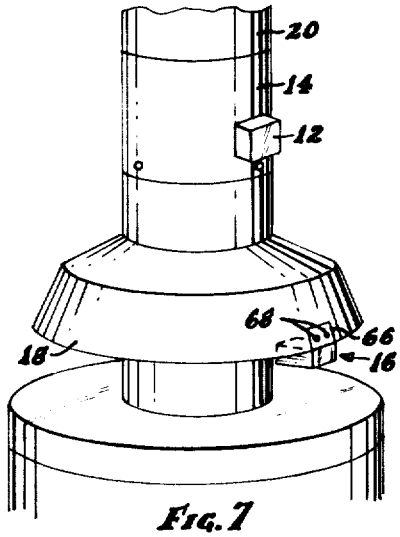
FIG. 7 is a view similar to FIG. 6, illustrating both the damper components and the control means as installed onto a furnace or the like, but of configuration different from that of FIG. 6.
Figure 8:
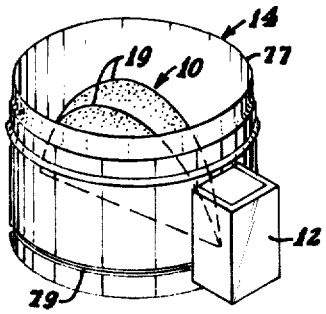
FIG. 8 is a pictorial representation of the damper and damper control means, mounted on a unit of duct-work as indicated in FIGS. 1 and 2, but on a smaller scale.
Figure 9:
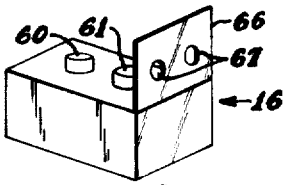
FIG. 9 is a pictorial representation of the control means which is shown in FIGS. 6 and 7 as mounted on the draft diverter.

More particularly, as to the two thermal discs 60 and 61, these are located in the safety control unit 16 which is mounted in the draft diverter component 18 of the furnace ductwork 14 (FIGS. 6 and 7).

This positioning of the safety control unit 16, which contains the two heat-responsive thermal discs 60 and 61, provides great safety; for, when there occurs any heat build-up in the furnace's exhaust ductwork 20 for whatever reason (clogging of the flue or even anything which would cause the damper 10 to remain in duct-closed position even though both the gas valves 57 and 64 were open), that heat will cause both thermal discs 60 and 61 to open their circuits (respectively 54 and 63) each itself sufficient to prevent gas-flow through the gas line 58, by closing gas valves 57 and 64, respectively.

(The operation assumes that the high limit switch 65, which is a component of the furnace and is in series with the gas valve control 56 in circuit 54, is closed.)

The control 16 has an upturned flange 66, with holes 67 for screws 68 to fasten the unit 16 to the draft diverter 18.

Mechanism details of damper control 12:

The damper control 12, as shown, has been described above generally in its functional aspects; and now it is described in respect to the structural details and concepts which provide those operational functions.

Accordingly, the structural details of the damper control 12 are best shown in FIGS. 1 through 5, and 8.

Figure 1:
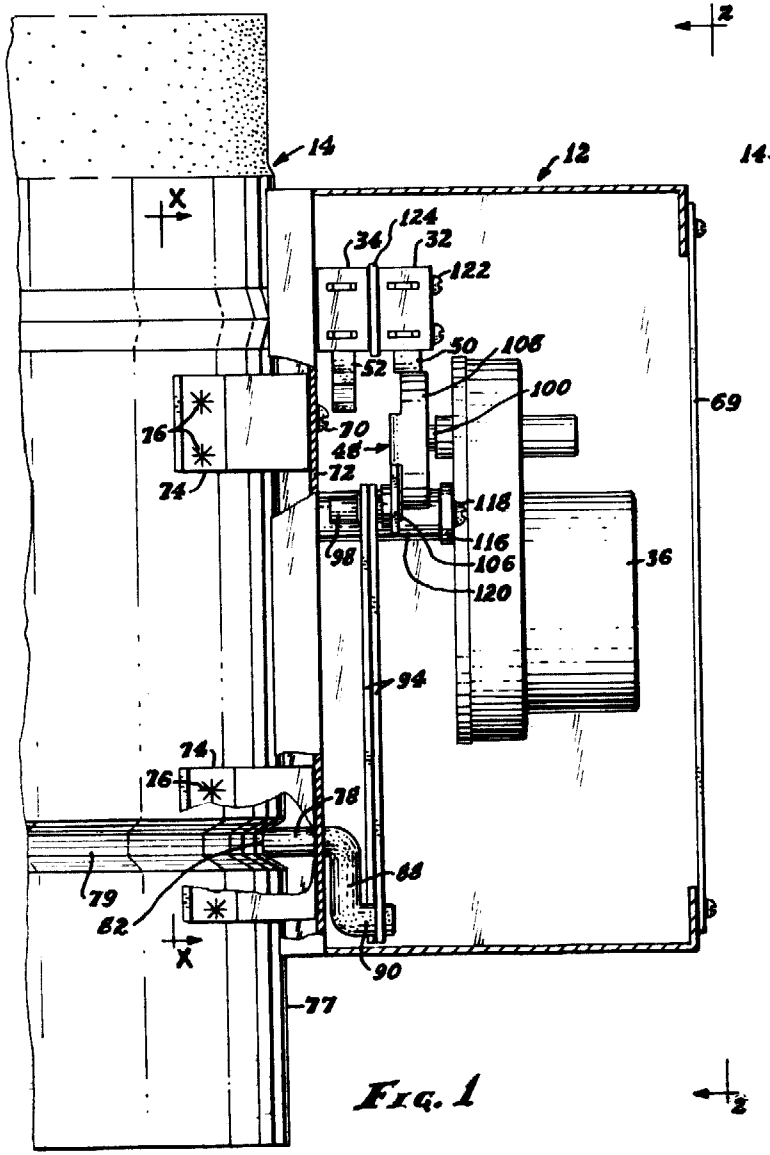

The mounting of damper control 12 is shown in FIGS. 1 and 2 (the cover plate 69 of control unit 12 being omitted for clarity in FIG. 2) as by screws 70 extending through a rear wall 72 of control unit 12 into mounting brackets 74 shown welded as at 76 to the duct-section 14.

(That duct-section 14 is the section or duct-component (FIG. 8) which is inserted into the ductwork 20.)

The damper half-plates 19 of damper 10 are shown as each mounted (in the duct-section 14) on a horizontal rod 78 which extends diametrically through the duct-section 14, that mounting being shown as being at a location where the side-wall 77 of duct-section 14 is provided with an internal bead or flange 79, cross-sectionally of a V-shape or U-shape, which provides the double advantage of a stiffening rim and a wall 80 onto which the damper plates 19 of damper 10 seat.

The rods 78 pass through the wall 77 of duct-section 14 by passing through holes 82 in the duct-wall 77 in line with the bead or flange 79, those holes 82 being small enough in relation to the size of the rods 78 to provide support thereof although permitting the rotatability of rods 78.

There are mounting holes 84 in the opposite side wall portion 77 of duct-section 14, opposite those holes 82 indicated in FIGS. 1 and 2; and the corresponding spacing of holes 82 on one side, and of holes 84 on the other side, provides the spacing 22 (FIGS. 3 and 4) already mentioned.

The mounting of damper half-plates 19 of damper 10 onto the support rods 78 is shown as by welding 86, which provides that the plates 19 are fixed relative to the rods 78; and thus the controlled rotation of support rods 78 is operative to correspondingly control the movement of damper plates 19 in and between their duct-closing (FIG. 3) position, and the duct-open (FIG. 4) position.

The illustrated controlled rotation of support rods 78 is now described.

As shown in FIGS. 1 through 4, the end-portion of rods 78 adjacent the control unit 12 is shown as integrally bent transversely to provide a crank-arm 88 having an axially-bent end finger 90 which provides a crank member for the rods 78.

These crank-fingers 90 of rods 78 are shown at respectively received in holes 92 of control links 94, the ends thereof opposite the holes 92 having holes 96 which rotatively receive a pin 98 fixed to the cam member 48 mentioned above; and, as more particularly described herein, it is the cam member 48 which both controls actuation of micro-switch control blades 50–52, and controls rotation of rods 78 through crank-fingers 90.

Figure 4:
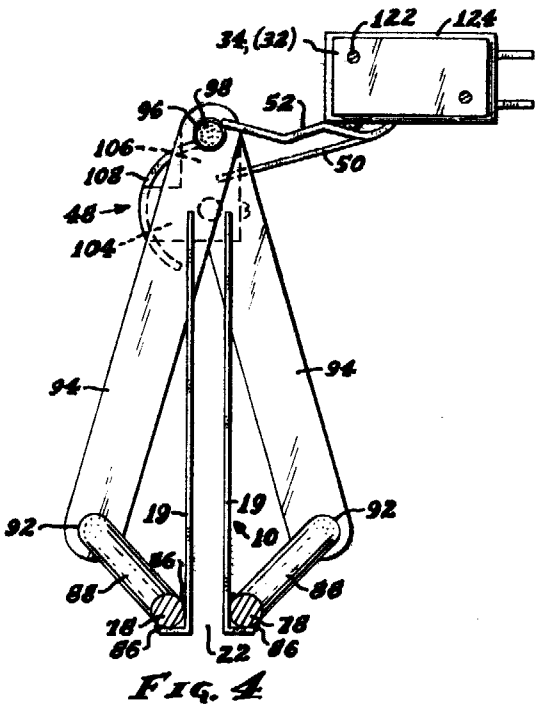
FIG. 4 is a view similar to FIG. 3, but illustrating the duct in an open position, and taken generally as indicated by view-line X—X of FIG. 1.
Figure 5:
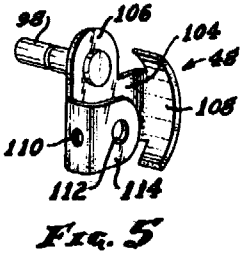
FIG. 5 is a pictorial representation of a control cam component illustrated in the preceding views.

Further details of the cam member 48, as shown, are now set forth; and these may be probably most easily understood by considering FIGS. 1,2, and 5, along with the sequential representation shown in FIGS. 3 and 4.

The cam member 48 is shown as carried on a shaft 100, affixed thereto as by set screw 102, the shaft 100 being driven by suitable gearing or other drive means from the motor 36.

The cam member 48 is shown as having a pair of arms 104 and 106, as shown, these being shown as extending generally radially from the shaft 100 at a spacing therearound of 90° as shown. The cam-arm 106 is shown as provided with a hole 107; and it is through this hole 107, in the embodiment shown, through which is fastened the aforesaid pin 98, the movement of the cam member 48 thus being effective through its arm 106 and the pin 98 to move the control links 94. That is, noting the differences between FIGS. 3 and 4, the movement of cam member 48 (counterclockwise as shown in FIGS. 3 and 4) swings the pin 98 in a counterclockwise direction, between the positions shown in FIGS. 3 and 4; and, since the cam-pin 98 is received in holes 96 of the control links 94, the counterclockwise travel of cam-pin 98 is operative through the links 94 to rotate damper-support rods 78 in rotational directions, one rod 78 rotating clockwise and the other rod 78 rotating counterclockwise in their respective movements between their position in FIG. 3 and subsequently in FIG. 4.

Still noting particularly FIGS. 3 and 4, it will be observed that such rotation of the damper-support rods 78 is effective to move the damper-plates 19 carried thereon between the duct-closed position of FIG. 3 and the duct-open position of FIG. 4, the rods 78 having travelled 90° in this actuation.

Further control by the control cam 48 is as to the microswitches 32 and 34, as now described.

The electric control achieved by the control cam 48 is shown as [being] having the cam-arm 104 bent to provide a generally semi-cylindrical extension 108, of slightly less than 180° in extent. This curved extension 108 is shown as engageable with the control arm 50 of microswitch 32, being effective as shown in FIG. 3 to hold that microswitch 32 in switch-closed position in the FIG. 3 position in which the damper 10 is in duct-closed position; although the curved extension 108 is shown in FIG. 4 to be out of engagement with control blade 50 of microswitch 32 in the FIG. 4 position in which the damper 10 is in duct-open position.

Further electrical control, by the cam member 48, is also achieved by its having its pin 98 extending (leftwardly in FIG. 1) past the location in which it receives the control links 94, sufficiently far such that the outer (leftward in FIG. 1) end of pin 98 moves in a path which brings it into contact with the control blade 52 of microswitch 34. This engagement of cam-pin 98 with control blade 52 of microswitch 34 is shown in FIG. 4 as being such as to have that control blade 52 in switch-closing position, in the FIG. 4 position in which the damper is in duct-open position; but the cam-pin 98 is shown in FIG. 3 as being removed from the control blade 52 of microswitch 34 in the FIG. 3 position in which the damper 10 is in duct-closed position.

The location of the control cam 48 is thus seen to be controlled as shown by the motor 36. That is, the output-shaft 100 of the motor 36 is the shaft which carries the control cam 48, that mounting of the control cam 48 being by the set screw 102 as mentioned above, the said screw 102 passing through a threaded opening 110 (FIG. 5) to bear upon the drive shaft 100 which has passed through an opening 112 in an ear 114 shown as integrally formed by suitably bending or otherwise forming the control cam 48.

Further, the location of control cam 48 with respect to the location of its mounting shaft 100 within the control unit 12 is also by the motor 36. That is, the motor 36 is shown as having a frame which has support ears 116 which are held as by screws 118 to an up-standing mounting lug or bracket 120 which extends from the rear wall 72 of control unit 12.

The two microswitches 32 and 34 are shown as mounted, as by screws 122 which extend through the microswitches 32 and 34, and through a intervening insulator or spacer 124, into the rear wall 72 of control unit 12; and the mounting of those microswitches 32 and 34 is, as shown in FIG. 1, such that their respective control blades 50 and 52 are in operative alignment, respectively, with the paths of curved cam extension 108 and the outer (leftward in FIG. 1) portion of the cam pin 98.

Further as shown in FIG. 10, it will be noted that all the circuitry and electrical components except the drive motor 36 and the switch 32 are shown as provided on low-voltage side of a step-down transformer 126, suitably reducing the voltage from power voltage of main power circuit 37.

It is thus seen that an automatic damper means and controls therefor, according to the present inventive concepts, provides a desired and advantageous device and installation yielding the high advantages of an automatic damper for exhaust ducts of a gas furnace or the like, which is conveniently installed as a unit, and which provides not only automaticness of operation but a high degree of safety. Thus, when the equipment is not operating, the damper is closed, thereby eliminating the tremendous waste of room heat which is otherwise wasted by going up the exhaust duct or stack; but when the equipment is operating, the damper is automatically assured of being open. Any heat build-up in the exhaust stack automatically shuts down the fuel supply.

Accordingly, it will thus be seen from the foregoing description of the invention according to this illustrative embodiment, considered with the accompanying drawings, that the present invention provides new and useful concepts of an automatic damper and control, yielding desired advantages and characteristics of actuation, energy savings, and exceedingly high safety, thus accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. Damper control means for a damper means of a flue duct, which is provided with support means which support the damper means in the associated duct-work in and between a duct-open and a duct-closing position, comprising, in combination:

crank means operatively connected to the support means;

link means for rotating the crank means;

movable first control means for moving the link means to rotate the crank means;

drive means for moving the movable control means for rotating the crank means; and actuation control means for actuating the said drive means, and operative in response to an associated thermostat means and to the previous movement of the drive means to actuate the drive means so as to cause and permit only movement thereof sufficient to rotate the crank means between the duct-closing and duct-open positions of the damper means.

2. The invention as set forth in claim 1 in a combination in which the said control means not only moves the link means but also controls the said actuation control means to achieve its operativity as stated.

3. The invention as set forth in claim 1 in a combination in which there are provided a pair of switch means in the actuation control means, one of which is operative to energize the drive means between the stated limits and the other of which is operative to permit energization of the drive means for a subsequent cycle even though the first has been caused by a previous cycle to be in non-energizing setting as the energizing the drive means.

4. The invention as set forth in claim 3 in a combination in which there is also provided a switch means which controls fuel supply to the associated heat means whose combustion products are vented by the flue duct, and the said control means comprises a cam member having a first portion which is operative to control the first of said switch means, and a second portion which is operative to control the switch means which controls the fuel supply.

5. The invention as set forth in claim 4 in a combination in which the said second portion of the control means also is supportingly connected to the said link means for providing the controlled movement thereof which rotates the crank means and thereby also the damper means.

6. The invention as set forth in claim 4 in which the said first portion of the control means cam member is provided as a curved cam component, and the said second portion of the control means cam member is provided as a pin means.

7. The invention as set forth in claim 5 in which the said first portion of the control means cam member is provided as a curved cam component, and the said second portion of the control means cam member is provided as a pin means.

8. An automatic damper means for an associated gas furnace or the like, having damper control means according to claim 1, the automatic damper means also including a damper means and a control means both provided on a section of duct which is adapted to be installed as a unit into the exhaust duct-work of the associated furnace or the like, and in which the damper means includes a damper plate means having at least two relatively large components which are movable relative to one another.

9. A damper for a duct of a gas furnace or the like, having a damper control means according to claim 1, in which the damper includes a plate means which in duct-closing position extends generally transverse to the duct for blocking exhaust flow through the duct, the improvement which comprises providing the plate means in at least two parts, and providing that in their most fully duct-closing position there it still a significant area not blocked thereby, the non-blocked are a being large enough to permit gas leakage to draft upwardly.

10. The invention as set forth in claim 9 in which there are two plate means, they being supported in a slightly spaced manner such that in most duct-closed position the spacing therebetween provides the said gas-leakage area.

11. A damper means for the flue gas duct of a gas furnace or the like, according to claim 1, in which the damper means is provided to be a plate means comprising at least two parts which are relatively movable with respect to one another, there being support means and control means which supportingly position the parts of the damper plate means in and between duct-open or duct-closed position.

12. A damper means for the flue gas duct of a gas furnace or the like, according to claim 1, in which control means are provided as to the fuel supply which are responsive to heat build-up in the draft diverter of the associated furnace or the like, the sensing component or components of the control means being located in the region of the draft diverter.

13. A damper means for the flue gas duct of a gas furnace or the like, as set forth in claim 12, in which the heat-responsive control means, which sense heat-buildup in the draft diverter, also are operative, upon sensing such heat-buildup in the draft diverter, to de-energize the actuation means of the damper.

14. Damper control means for a damper means of a flue duct, which is provided with support means which support the damper means in the associated duct-work in and between a duct-open and a duct-closing position, comprising:

crank means operatively connected to the support means;

link means for rotating the crank means;

movable first control means for moving the link means to rotate the crank means;

drive means for moving the movable control means for rotating the crank means;

actuation control means for actuating the said drive means, and operative in response to an associated thermostat means and to the previous movement of the drive means to actuate the drive means so as to cause and permit only movement thereof sufficient to rotate the crank means between the duct-closing and duct-open positions of the damper means;

and in which there are provided a pair of switch means in the actuation control means, one of which is operative to energize the drive means between the stated limits and the other of which is operative to permit energization of the drive means for a subsequent cycle even though the first has been caused by a previous cycle to be in non-energizing setting as to energizing the drive means;

in a combination in which a first portion of the control means controls one of the said switch means and a second portion of the control means is a pin means which controls the second of the switch means and also is supportingly connected to the said link means for providing the controlled movement thereof which rotates the crank means and thereby also the damper means.

15. A damper control means for a gas furnace or the like in which heat-sensitive means are provided in the draft diverter opening component of the associated furnace, and is operative, in response to heat build-up therein caused by any blockage of the exhaust stack above the draft diverter component, which heat build-up causes spillage of hot flue gases out of the opening of the draft diverter hood, to close the associated energy-supply to the said furnace or the like, the heat-sensitive means being of a type which achieves that energy-supply closing in response to an increase of heat at the location of the said draft diverter opening;

in which the said heat-sensitive means includes a pair of heat-sensitive components, each of which is operative in response to heat build-up in the draft diverter to close the associated energy-supply to the said furnace or the like; and one of the heat-responsive components is in a thermocouple circuit independent of line voltage, thereby providing special safety means for achieving energy-supply shutoff not only independently of line voltage but also in circuitry which is non-electrically resettable, avoiding thereby any cycling or flutter of the control thereby achieved for the energy-supply means by the heat-responsive component of the thermocouple circuit, and also thereby avoiding any possibility of continuation of exhaust gas spillage out the draft diverter once the thermocouple circuit's heat-responsive component has achieved energy-supply shutoff even momentarily.

*16. A damper control means for a gas furnace or the like in which heat-sensitive means are provided in the draft diverter opening component of the associated furnace, and is operative, in response to heat build-up therein caused by any blockage of the exhaust stack above the draft diverter component, which heat build-up causes spillage of hot flue gases out of the opening of the draft diverter hood, to close the associated energy-supply to the said furnace or the like, the heat-sensitive means being of a type which ahcieves that energy-supply closing in response to an increase of heat at the location of the said draft diverter opening;*

*in which the said heat-sensitive means includes a heat-sensitive component which is operative in response to heat build-up in the draft diverter to close the associated energy-supply to the said furnace or the like; and the heat-responsive component is in a thermocouple circuit independent of line voltage, thereby providing special safety means for achieving energy-supply shut-off not only independently of line voltage but also in circuitry which is non-electrically resettable, avoiding thereby any cycling or flutter of the control thereby achieved for the energy-supply means by the heat-responsive component of the thermocouple circuit, and also thereby avoiding any possibility of continuation of exhaust gas spillage out the draft diverter once the thermocouple circuit's heat-responsive component has achieved energy-supply shutoff even momentarily.*

* * * * *